(12) United States Patent
Davydov et al.

(10) Patent No.: US 9,680,669 B2
(45) Date of Patent: Jun. 13, 2017

(54) WIRELESS INTERFERENCE MITIGATION

(71) Applicant: Intel Corporation, Santa Clara, CA (US)

(72) Inventors: Alexei Davydov, Nizhny Novgorod (RU); Seunghee Han, Cupertino, CA (US); Gregory Morozov, Nizhny Novgorod (RU); Alexander Maltsev, Nizhny Nogorod (RU); Ilya Bolotin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 82 days.

(21) Appl. No.: 14/440,701

(22) PCT Filed: Dec. 3, 2013

(86) PCT No.: PCT/US2013/072866
§ 371 (c)(1),
(2) Date: May 5, 2015

(87) PCT Pub. No.: WO2014/089073
PCT Pub. Date: Jun. 12, 2014

(65) Prior Publication Data
US 2015/0256279 A1    Sep. 10, 2015

Related U.S. Application Data

(60) Provisional application No. 61/732,851, filed on Dec. 3, 2012.

(51) Int. Cl.
*H04W 4/00*    (2009.01)
*H04L 25/03*    (2006.01)
(Continued)

(52) U.S. Cl.
CPC ..... *H04L 25/03305* (2013.01); *H04B 1/3827* (2013.01); *H04B 7/0452* (2013.01);
(Continued)

(58) Field of Classification Search
None
See application file for complete search history.

(56) References Cited

U.S. PATENT DOCUMENTS

2004/0131011 A1*  7/2004  Sandell ................. H04L 1/0618
                                                                   370/210
2005/0068886 A1   3/2005  Wang et al.
(Continued)

FOREIGN PATENT DOCUMENTS

KR         20100103310 A        9/2010

OTHER PUBLICATIONS

International Preliminary Report on Patentability mailed Jun. 18, 2015 from International Application No. PCT/US2013/072866.
(Continued)

*Primary Examiner* — Minh-Trang Nguyen
(74) *Attorney, Agent, or Firm* — Schwabe, Williamson & Wyatt, P.C.

(57) ABSTRACT

Embodiments can relate to an apparatus for interference mitigation in a wireless communication. The apparatus can comprise at least one processing element arranged to extract, from a received PDCCH or EPDCCH signal, modulated symbols; the modulated symbols having been modulated using a linear m-ary modulation constellation. The apparatus also comprises a demodulator to demodulate the extracted PDCCH or EPDCCH modulated symbols; the demodulator being operable to demodulate the extracted symbols according to the linear m-ary modulation constellation.

30 Claims, 9 Drawing Sheets

(51) Int. Cl.
| | |
|---|---|
| H04W 72/12 | (2009.01) |
| H04B 1/3827 | (2015.01) |
| H04W 84/18 | (2009.01) |
| H04W 92/18 | (2009.01) |
| H04W 72/04 | (2009.01) |
| H04L 5/00 | (2006.01) |
| H04W 36/10 | (2009.01) |
| H04W 52/40 | (2009.01) |
| H04W 76/04 | (2009.01) |
| H04J 11/00 | (2006.01) |
| H04W 72/08 | (2009.01) |
| H04W 76/02 | (2009.01) |
| H04W 52/02 | (2009.01) |
| H04L 1/00 | (2006.01) |
| H04W 24/02 | (2009.01) |
| H04L 25/02 | (2006.01) |
| H04B 7/0452 | (2017.01) |
| H04B 7/06 | (2006.01) |
| H04B 7/155 | (2006.01) |
| H04L 1/18 | (2006.01) |
| H04W 84/04 | (2009.01) |
| H04L 27/00 | (2006.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(56) References Cited

U.S. PATENT DOCUMENTS

| | | | |
|---|---|---|---|
| 2009/0073922 A1* | 3/2009 | Malladi | H04L 1/0004 370/328 |
| 2011/0096814 A1* | 4/2011 | Wu | H04L 27/2604 375/219 |
| 2011/0103335 A1 | 5/2011 | Golitschek et al. | |
| 2012/0177089 A1 | 7/2012 | Pelletier et al. | |
| 2012/0224545 A1 | 9/2012 | Ohta et al. | |

OTHER PUBLICATIONS

International Search Report and Written Opinion mailed Mar. 20, 2014 from International Application No. PCT/US2013/072866.
3GPP TS 36.211 V11.0.0 (Sep. 2012); "Technical Specification Group Radio Access Network; Evolved Universal Terrestrial Radio Access (E-UTRA); Physical Channels and Modulation (Release 11)," 106 pages.

* cited by examiner

WIRELESS INTERFERENCE MITIGATION

CROSS REFERENCE TO RELATED APPLICATIONS

The present application is a national phase entry under 35 U.S.C. §371 of International Application No. PCT/US2013/072866, filed Dec. 3, 2013, entitled "WIRELESS INTERFERENCE MITIGATION", which designates the United States of America, which claims priority to U.S. Patent Application No. 61/732,851, filed Dec. 3, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

TECHNICAL FIELD

Embodiments relate to wireless communications, and more particularly, to interference mitigation in wireless communication.

BACKGROUND

The $3^{rd}$ Generation Partnership Project (3GPP) TS 36.211, v11.0.0 (2012-10) and its latest incarnation 3GPP TS 36.211, v11.4.0 (2013-10), both entitled *Physical Channels and Modulation*, describe the physical channels and the modulation schemes used to realise the Long Term Evolution-Advanced (LTE-A) air-interface.

The modulation schemes for the Physical Downlink Control Channel (PDCCH) and the Physical Downlink Control Channel (EPDCCH) are specified section 6.8.3 of TS 36.211, together with section 7.1.2, as being Quadrature Phase Shift Keying (QPSK).

The reliability of the PDCCH or EPDCCH was an important consideration in the control channel design. If resource allocation information for a Physical Downlink Shared Channel (PDSCH) conveyed by the PDCCH or an EPDCCH is incorrectly received, the decoding of the corresponding PDSCH will likely fail, which, in turn, will have a detrimental impact on overall system performance. Therefore, transmission techniques such as channel coding, spatial and frequency diversity were considered in the PDCCH and EPDCCH design to improve reliability of such channels.

However, interference may occur when a User Equipment (UE) experiences, for example, co-channel interference originating from either inter-cell UE communications or co-scheduled intra-cell UE communications; both of which can limit performance.

BRIEF DESCRIPTION OF THE DRAWINGS

Embodiments described herein are illustrated, without limitation, by way of example, in the accompanying drawings.

DESCRIPTION OF EMBODIMENTS

Figure 1:
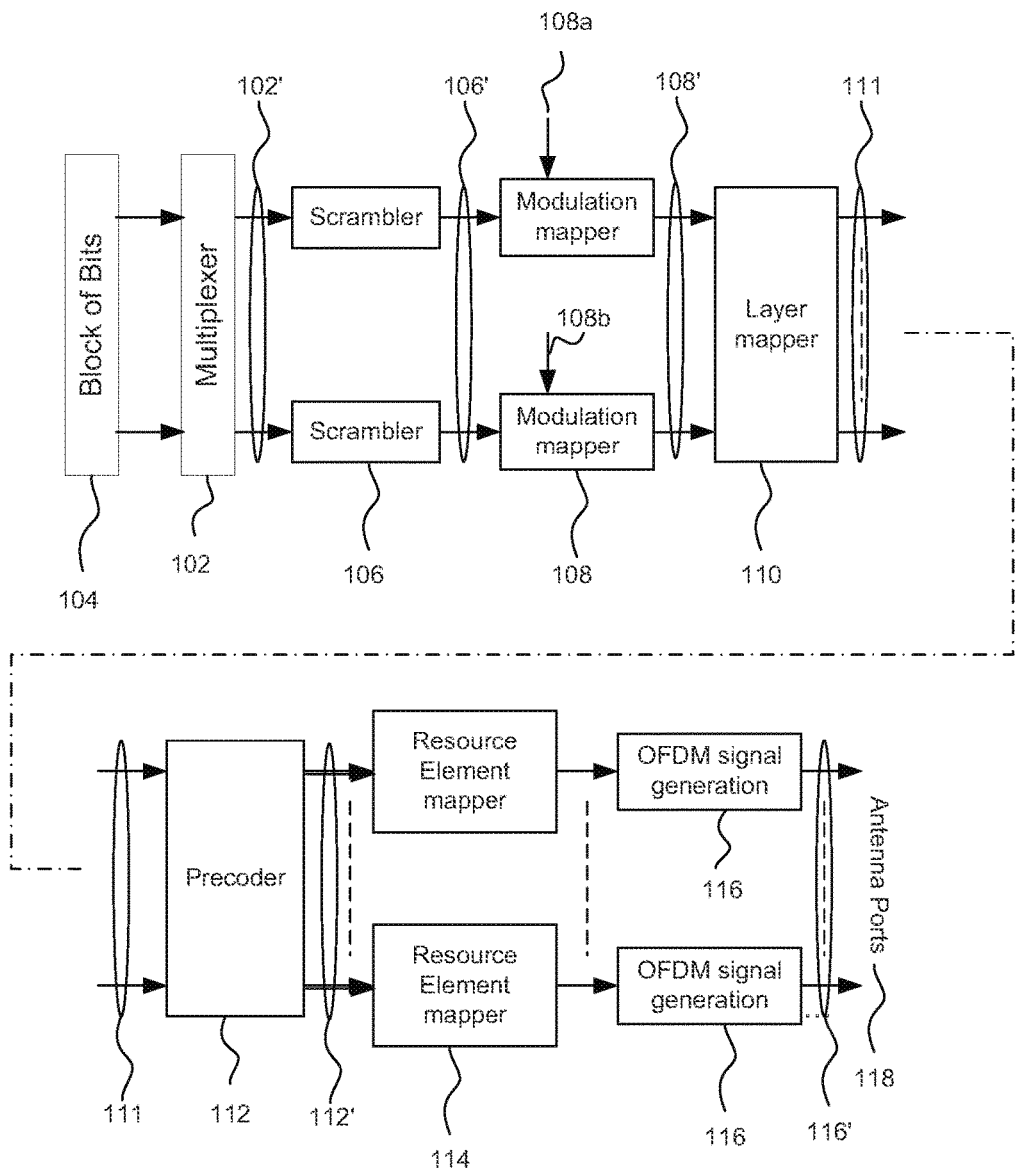
FIG. 1 shows a system for realising a PDCCH or EPDCCH.

FIG. 1 schematically illustrates the structure of a system 100 for realising a control channel, such as, for example, a PDCCH or an EPDCCH, according to an embodiment. The system 100 of FIG. 1 depicts a structure that can apply to one or more than one other physical control channel as well as to the PDCCH. A baseband signal representing an uplink/downlink physical channel can be defined using the following operations performed by the described entities. The system 100 may include a multiplexer 102 for multiplexing a block of bits 104, followed by a scrambler 106 to scramble the multiplexed block of bits 102' to be transmitted in a transmission (e.g., over a physical channel). Using information about the channel, the transmitter may tailor the transmit signal to the channel in a manner that simplifies or improves receiver processing. The receiver may generate the channel-related information by processing training signals received from the transmitter.

A modulation mapper 108 may be provided to modulate the scrambled 106' bits to generate modulation symbols 108' in the transmission. These modulation symbols 108' can be complex-valued modulation symbols. An embodiment provides for the modulation mapper 108 using a linear m-ary modulation constellation, where $m \geq 2$. Furthermore, embodiments can be realised in which $m > 2$. The linear m-ary constellation can be arranged to map a predetermined number of bits, such as one bit or more than one bit, to respective constellation I and Q values such that all constellation points are linearly disposed. An example of such an m-ary linear constellation is PAM such as, for example, 4-PAM, that is, m=4; an example of which is shown in table 1 below, which maps two bits, b(i), b(i+1), to respective constellation values. Embodiments are provided in which the constellation comprises only linearly disposed constellation points.

TABLE 1

| 4-PAM modulation mapping | | |
|---|---|---|
| b(i), b(i + 1) | I | Q |
| 00 | $3/\sqrt{5}$ | 0 |
| 01 | $1/\sqrt{5}$ | 0 |
| 10 | $-1/\sqrt{5}$ | 0 |
| 11 | $-3/\sqrt{5}$ | 0 |

It can be appreciated that the imaginary values of the quadrature channel have been set to zero. The I and Q channels are examples of first and second modulation channels that can take respective modulation values. The I channel is an example of a channel that comprises a respective first set of channel values, that is, constellation values. The Q channel is an example of a channel that comprises a respective first set of channel values, that is, constellation values. In the above example, the Q channel values are all zero.

In the case of a single bit, b(i), the constellation could be that given in table 2 below:

TABLE 2

BPSK modulation mapping

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

A further embodiment of a constellation that maps two bits, b(i), b(i+1), to respective constellation values is given below in table 3. The constellation has an orientation or rotation given by $e^{j\pi/4}$ relative to the I channel axis.

TABLE 3

4-PAM rotated modulation mapping.

| b(i), b(i + 1) | I | Q |
|---|---|---|
| 00 | $3/\sqrt{10}$ | $3/\sqrt{10}$ |
| 01 | $1/\sqrt{10}$ | $1/\sqrt{10}$ |
| 10 | $-1/\sqrt{10}$ | $-1/\sqrt{10}$ |
| 11 | $-3/\sqrt{10}$ | $-3/\sqrt{10}$ |

It will be appreciated that the values of table 1 and the values of table 4 are related by the rotating the values of table 4 by $\pi/4$ on I/Q signal plane, which can be achieved via multiplication by $e^{-j\pi/4}$.

In general, embodiments map one or more bits to linear modulation constellations. The points of the linear modulation constellations are all linearly disposed relative to one another. Such a linear disposition can be realised a number of different ways, such as, for example, by setting, in an IQ modulator, one of the I or Q channels to zero, which would give constellation values along the imaginary or real axis. Alternatively, the IQ modulator could merely map the constellation points such that the I and Q values are associated via Q=mI+c, where m is the gradient of the line along which the constellation points are disposed and c is the intercept of that line with the imaginary or Q axis. Embodiments can be realised in which c=0 and m=1 taken jointly and severally. However, other values or c and m can be used also.

Other embodiments can be arranged such that the modulation mapper 108 may additionally selectively switch to at least one alternative modulation constellation or to more than one alternative modulation constellation. For example, the modulation mapper 108 can be configured to switch to using at least one of a binary phase shift keying (BPSK) constellation, a quadrature phase shift keying (QPSK) constellation, and a quadrature amplitude (QAM) constellation such as, for example, 8-QAM, 16-QAM, 64-QAM. The type of modulation used may depend on the signal quality. The modulation mapper 108 can be arranged to switch to using such a linear modulation constellation if interference exceeds a predetermined threshold. The modulation mapper 108 can be responsive to signal quality or a measure of interference as can be appreciated by optional inputs 108a and 108b.

A layer mapper 110 may then map the complex-valued modulation symbols 108' onto a transmission layer or several transmission layers 111.

A precoder 112 may then precode the layered modulation symbols 111 for transmission. The precoder 112 may include, for example, a zero-forcing operation. The precoder 112 may encode the layered complex-valued modulation symbols 111 on each layer for transmission on respective antenna ports. Precoding may be used to convert the antenna domain signal processing into the beam-domain processing, that is, for beam-forming. In addition, the antenna ports may also be coupled to a plurality of antennas (not shown).

The precoding performed by the precoder 112 may be chosen from a set of precoding matrices, called a codebook, that is known to both a receiver and a transmitter.

A resource element mapper 114 can be used to map complex-valued modulation symbols 112' for each antenna port to the available resource elements. An OFDM signal generation module 116, or several such modules, can then generate a complex-valued time-division duplex (TDD) and/or frequency division duplex (FDD) OFDM signal 116' for each antenna port 118.

The precoded transmission can then be transmitted to a UE or to multiple UEs by sending the precoded transmission to the antenna ports. Specifically, the precoded transmission can be transmitted to a UE or to multiple UEs using a plurality of antennas coupled to the antenna ports.

A receiver can use the linear m-ary modulation constellation for the PDCCH and EPDCCH to realise interference mitigation as follows.

Consider a single antenna UE and one source of interference such that the received signal can be represented as:

$$\begin{bmatrix} r_I \\ r_Q \end{bmatrix} = \begin{bmatrix} h_I & -h_Q \\ h_Q & h_I \end{bmatrix} \begin{bmatrix} s_I \\ s_Q \end{bmatrix} + \begin{bmatrix} g_I & -g_Q \\ g_Q & g_I \end{bmatrix} \begin{bmatrix} t_I \\ t_Q \end{bmatrix} + \begin{bmatrix} n_I \\ n_Q \end{bmatrix},$$

where
- $\{r_I, r_Q\}$ are real and imaginary parts of the received signal;
- $\{h_I, h_Q\}$ are real and imaginary parts of the serving channel;
- $\{g_I, g_Q\}$ are real and imaginary parts of the interfering channel;
- $\{s_I, s_Q\}$ are real and imaginary parts of the serving signal;
- $\{t_I, t_Q\}$ are real and imaginary parts of the interfering signal; and
- $\{n_I, n_Q\}$ are real and imaginary parts of thermal noise and residual interference.

The received signal model is simplified to $$\lambda \begin{bmatrix} r_I \\ r_Q \end{bmatrix} = \begin{bmatrix} h_I \\ h_Q \end{bmatrix} s_I + \begin{bmatrix} g_I \\ g_Q \end{bmatrix} t_I + \lambda \begin{bmatrix} n_I \\ n_Q \end{bmatrix} = \begin{bmatrix} h_I & g_I \\ h_Q & g_Q \end{bmatrix} \begin{bmatrix} s_I \\ t_I \end{bmatrix} + \lambda \begin{bmatrix} n_I \\ n_Q \end{bmatrix}$$

where $\lambda=\exp(-j\pi/4)$ in the case a 4-PAM rotated constellation and $\lambda=1$ in the case of conventional a 4-PAM constellation, $s_I, t_I \in \{3/\sqrt{5}, 1/\sqrt{5}, -1/\sqrt{5}, -3/\sqrt{5}\}$. It can be seen from the above equation that the structure of the serving and interfering signals (since only one dimension of I/Q signal plane is used) allows interference mitigation with one receiving antenna, e.g. by using a zero-forcing approach:

$$\begin{bmatrix} \hat{s}_I \\ \hat{t}_I \end{bmatrix} = \begin{bmatrix} h_I & g_I \\ h_Q & g_Q \end{bmatrix}^{-1} \lambda \begin{bmatrix} r_I \\ r_Q \end{bmatrix} = \begin{bmatrix} s_I \\ t_I \end{bmatrix} + \lambda \begin{bmatrix} h_I & g_I \\ h_Q & g_Q \end{bmatrix}^{-1} \begin{bmatrix} n_I \\ n_Q \end{bmatrix},$$

where $\hat{s}_I$ and $\hat{t}_I$ are estimations of the de-rotated signals. It can be appreciated that the signal of interest, that is the serving signal estimate, $\hat{s}_I$, is entirely decoupled from the interfering signal estimate, $\hat{t}_I$.

The UE receiver signal processing can be realised using an MMSE receiver that takes into account noise and residual interference (from one or more other interfering cells) power as follows:

$$P_{MMSE}\lambda \begin{bmatrix} r_I \\ r_Q \end{bmatrix}, \text{ where } P_{MMSE} = (h^T R_{gn}^{-1} h)^{-1} h^T R_{gn}^{-1}, h = \begin{bmatrix} h_I \\ h_Q \end{bmatrix},$$

$R_{gn}$ is a covariance matrix of interfering channel $$\begin{bmatrix} g_I \\ g_Q \end{bmatrix}$$

and noise $$\begin{bmatrix} n_I \\ n_Q \end{bmatrix}$$

The covariance matrix can be calculated as follows $$R_{gn} = \begin{bmatrix} g_I^2 & g_I g_Q \\ g_I g_Q & g_Q^2 \end{bmatrix} + E\left(\begin{bmatrix} n_I^2 & n_I n_Q^* \\ n_I^* n_Q & n_Q^2 \end{bmatrix}\right),$$

where $E(\cdot)$ is expectation function, which can be realised by averaging the additive noise samples in time and/or frequency. For the uncorrelated additive noise, the expectation function is $$E\left(\begin{bmatrix} n_I^2 & n_I n_Q^* \\ n_I^* n_Q & n_Q^2 \end{bmatrix}\right) = \frac{\sigma^2}{2} \cdot I,$$

where $\sigma^2$ is noise and residual interference power and I is identity matrix. The skilled person will recognize the superscript "T" as representing the transpose of a matrix and the superscript "−1" as the inverse of a matrix.

The above embodiments can be generalised for two or more receiving antennas. It will be appreciated that the effect of a number of interfering signals can be mitigated. Considering a single eNode B (eNB) transmit antenna and two UE receiving antennas, the received signal model can be defined as $$\lambda \begin{bmatrix} r_I(1) \\ r_Q(1) \\ r_I(2) \\ r_Q(2) \end{bmatrix} = \begin{bmatrix} h_I(1) & -h_Q(1) \\ h_Q(1) & h_I(1) \\ h_I(2) & -h_Q(2) \\ h_Q(2) & h_I(2) \end{bmatrix} \begin{bmatrix} s_I \\ s_Q \end{bmatrix} + \begin{bmatrix} g_I(1) & -g_Q(1) \\ g_Q(1) & g_I(1) \\ g_I(2) & -g_Q(2) \\ g_Q(2) & g_I(2) \end{bmatrix} \begin{bmatrix} t_I \\ t_Q \end{bmatrix} + \lambda \begin{bmatrix} n_I(1) \\ n_Q(1) \\ n_I(2) \\ n_Q(2) \end{bmatrix},$$

where a number in the brackets indicates a respective receiving antenna. If a linear constellation is used, such as, a 4-PAM constellation, the signal model can be simplified to:

$$\lambda \begin{bmatrix} r_I(1) \\ r_Q(1) \\ r_I(2) \\ r_Q(2) \end{bmatrix} = \begin{bmatrix} h_I(1) & g_I(1) \\ h_Q(1) & g_Q(1) \\ h_I(2) & g_I(2) \\ h_Q(2) & g_Q(2) \end{bmatrix} \begin{bmatrix} s_I \\ t_Q \end{bmatrix} + \lambda \begin{bmatrix} n_I(1) \\ n_Q(1) \\ n_I(2) \\ n_Q(2) \end{bmatrix}$$

In one embodiment, the receiver signal processing can be accomplished by using zero-forcing approach, as follows $$\begin{bmatrix} \hat{s}_I \\ \hat{t}_Q \end{bmatrix} = (AA^T)^{-1} A^T \lambda \begin{bmatrix} r_I(1) \\ r_Q(1) \\ r_I(2) \\ r_Q(2) \end{bmatrix} = \begin{bmatrix} s_I \\ t_Q \end{bmatrix} + \lambda (AA^T)^{-1} A^T \begin{bmatrix} n_I(1) \\ n_Q(1) \\ n_I(2) \\ n_Q(2) \end{bmatrix},$$

where $$A = \begin{bmatrix} h_I(1) & g_I(1) \\ h_Q(1) & g_Q(1) \\ h_I(2) & g_I(2) \\ h_Q(2) & g_Q(2) \end{bmatrix}, \begin{bmatrix} n_I(1) \\ n_Q(1) \\ n_I(2) \\ n_Q(2) \end{bmatrix}$$

represents noise and residual interference.

In another embodiment, a linear MMSE receiver can be used to demodulate the received signal, as follows:

$$(h^T R_{gn}^{-1} h)^{-1} h^T R_{gn}^{-1} \lambda \begin{bmatrix} r_I(1) \\ r_Q(1) \\ r_I(2) \\ r_Q(2) \end{bmatrix}$$

can be used, where $$h = \begin{bmatrix} h_I(1) \\ h_Q(1) \\ h_I(2) \\ h_Q(2) \end{bmatrix},$$

$R_{gn}$ is a covariance matrix corresponding to interfering channel g, which is defined as $$g = \begin{bmatrix} g_I(1) \\ g_Q(1) \\ g_I(2) \\ g_Q(2) \end{bmatrix}$$

and noise and residual interference, $$\begin{bmatrix} n_I(1) \\ n_Q(1) \\ n_I(2) \\ n_Q(2) \end{bmatrix}.$$

The covariance matrix can be calculated as follows $$R_{gn} = g g^T + \frac{\sigma^2}{2} I.$$

For legacy or practical purposes, UEs served by, operating within or being subject interference within, a given cell will typically comprise a mixture of UEs that operate according to release 8 et seq of the LTE and LTE-A standards. Therefore, embodiments of a PDCCH and a EPDDCH can be shared for control channel transmissions to different types of UE. Nevertheless, it is preferable to separate the control channel structures. The separation can be directed to realising a mixture of control regions in the PDCCH and the EPDCCH, with some regions using the linear m-ary modulation constellations and other regions using existing prescribed modulation constellations. For a PDCCH, the foregoing can be achieved by indicating subframe sets, via, for example, a bitmap, where each bit indicates subframes that may be assumed by one category of UE, such as a release 12 UE, to have at least one linear m-ary modulation constellations for both serving and interfering channels. For a EPDCCH, additionally or alternatively, instead of subframe sets, a given EPDCCH resource(s) can be indicated as using the linear m-ary modulation constellation for serving and interfering channels.

Figure 2:
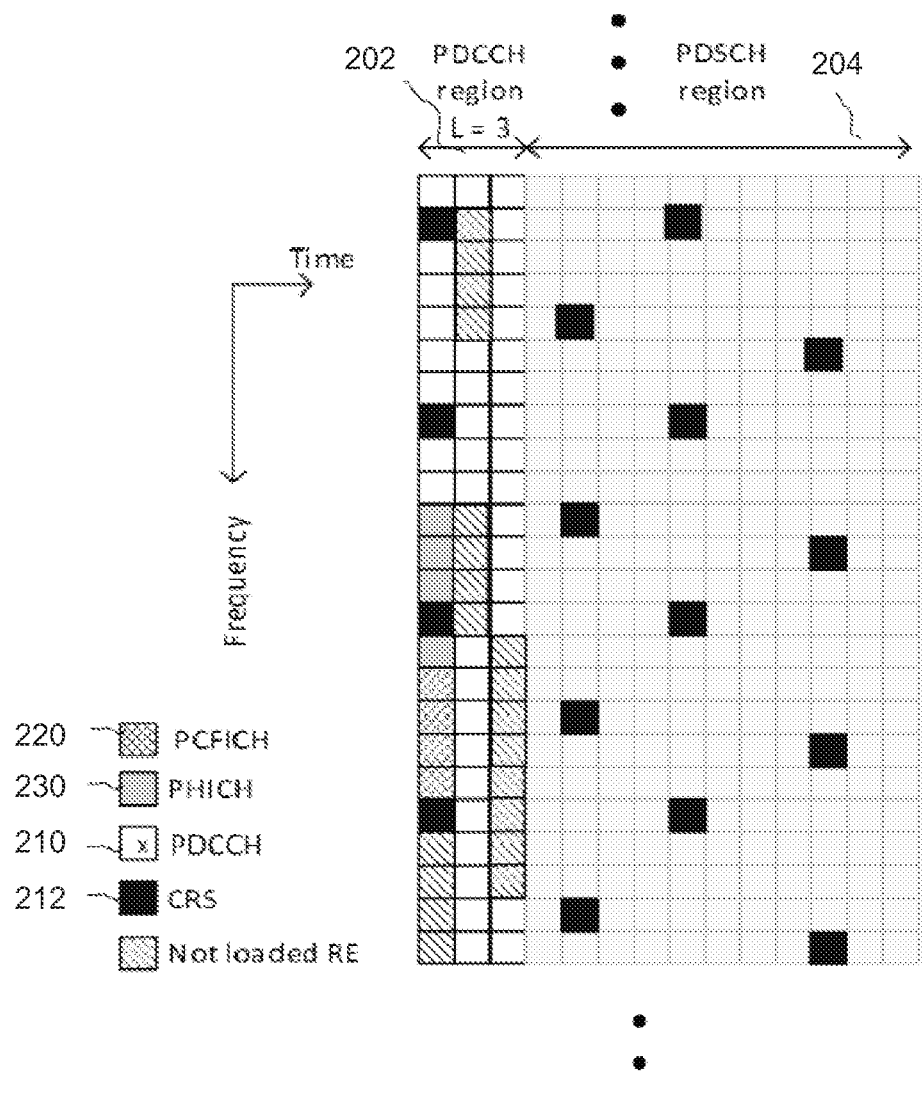
FIG. 2 is depicts a downlink LTE subframe.

FIG. 2 schematically illustrates a downlink LTE subframe 200 showing the structure of the PDCCH. Also depicted are two illustrative resource blocks out of a total of $N_{BB}$ resource blocks of the subframe. The downlink subframe 200 comprises fourteen OFDM symbols along the time axis and $N_{BB} \times N_{SC}^{RB}$ sub-carriers along the frequency axis. Therefore, the subframe comprises a plurality of resource blocks and $N_{symbol}=14$ times $N_{SC}=N_{BB} \times N_{SC}^{RB}$ resource elements. The data carried on the PDCCH can be referred to as downlink control information. Multiple UEs can be scheduled in one subframe of a radio frame, so multiple downlink control information messages can be sent using multiple PDCCHs. The PDCCH can be designed to demodulate based on cell-specific reference signals (CRS) common to an entire cell.

The PDCCH comprises a set of L OFDM symbols (L=1, 2, 3) in the beginning of each downlink subframe. The downlink subframe comprises a PDCCH region 202 spanning up to the first three OFDM symbols in this example arrangement. In other embodiments, a PDCCH transmission can use a different pattern of OFDM symbols. There is shown a PDSCH region 204 for carrying downlink data, which spans the remaining eleven OFDM symbols of the subframe. In the PDCCH region 202, as well as the PDCCH 210, a Cell Specific Reference Signal (CRS) 212 can also be transmitted. The CRS can also be transmitted in the downlink data (PDSCH) region 204. Other control information transmitted in the PDCCH region 202 of the subframe can comprise at least one of the Physical Control Format Indicator Channel (PCFICH) 220 and the Physical Hybrid-ARQ Indicator Channel (PHICH) 230. The PCFICH 220 informs the UE about the size of the control region (one, two or three OFDM symbols). There is only one PCFICH on each component carrier, i.e., in each cell. The PHICH 230 is used to signal hybrid-ARQ acknowledgements in response to uplink shared channel transmissions. Multiple PHICHs 230 can exist in each cell. In some example embodiments, at least one of the PDCCH, EPDCCH, PCFICH and CRS channels use the above described linear m-ary modulation constellations, taken jointly and severally in any and all permutations, to realise interference mitigation.

The PDCCH may not be adequate to convey information needed to allow a UE to take advantage of multiple transmission nodes in a heterogeneous network, which includes a number of different kinds of nodes in a given serve area. Heterogeneous networks should allow more UEs to be served simultaneously. To overcome certain limitations in the PDCCH, a EPDCCH can be used. The EPDCCH is configurable to use resource elements in an entire resource block or resource block pair; the pair being two contiguous resource blocks using the same subcarrier's subframe. This contrasts with the PDCCH that uses just the first one to three columns of OFDM symbols in a first slot resource block in a subframe. The greater flexibility in the use of resource elements within the resource block(s) means that the EPDCCH can be configured with increased capacity.

Figure 3:
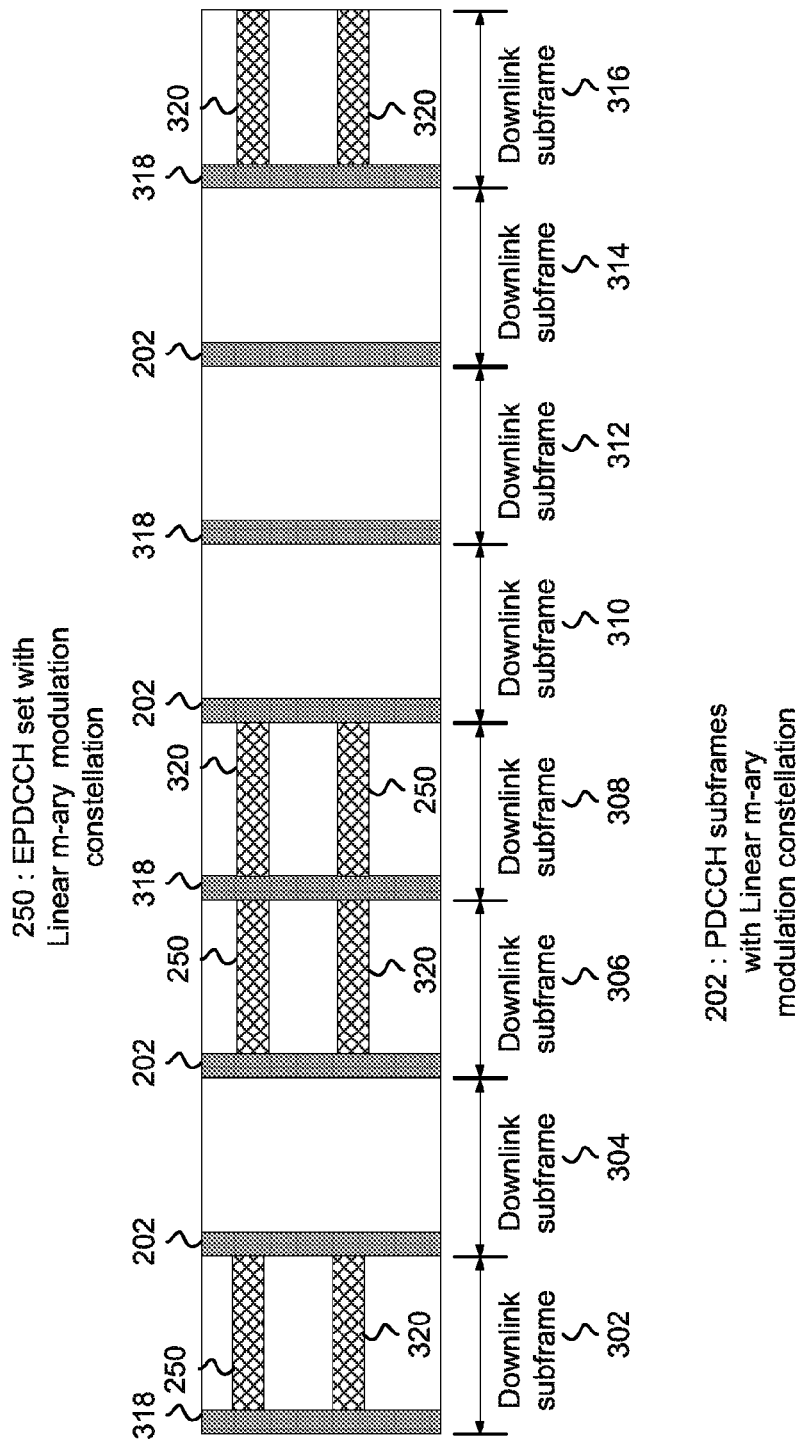
FIG. 3 shows a number of radio subframes with control channels.

FIG. 3 is a view 300 that schematically depicts a number of downlink subframes 302 to 316 showing the relative locations of PDCCHs 202 and EPDCCHs 250; at least one of which uses the linear m-ary modulation constellation and, in some instance, both the PDCCH 202 and the EPDCCH 250 use the linear m-ary modulation constellation. Still further, one or more of at least one of the PDCCHs 318 and EPDCCHs 320 can use conventional PDCCH modulation and conventional EPDCCH modulation, such as, for example, QPSK. The EPDCCH is transmitted within resource blocks in a similar manner to the PDCCH, but while the PDCCH is transmitted in the control region and spans the full system bandwidth, the EPDCCH is transmitted in the data region (PDSCH region 204) of the subframe and typically spans only a small portion of the overall bandwidth. Since this gives control over in which part of the overall spectrum an EPDCCH is transmitted, it provides for frequency-selective scheduling for control channels and allows interference mitigation. In the illustrated example, the EPDCCH occupies distinct bands of subcarriers in only a subset of the subframes. In contrast to the PDCCH, for the EPDCCH, the reference signal sequence is typically terminal-specific (or user-specific), i.e., each user terminal is explicitly configured with a parameter that is used to derive the reference-signal sequence and the EPDCCH allocation within subframe.

Embodiments, therefore, provide a control channel signal, such as, for example, a PDCCH or EPDCCH, comprising one or more than one OFDM symbol modulated using one or more than one of the linear modulation constellations described herein.

It will be appreciated that the signal output by an eNB may comprise a combination of control channel symbols from different controls channels and/or data. Suitably, embodiments provide a signal comprising at least one of a PDCCH resource element and a EPDCCH resource element; at least one the PDCCH resource element and the EPDCCH resource element comprising one or more OFDM symbols associated with one or more than one linear m-ary modulation constellation.

Additionally, the linear modulation constellation can comprise a variable first modulation component responsive the data and a fixed second modulation component having a constant modulation value. Still further, additionally or alternatively, at least the PDCCH resource element can have associated data for indicating which subframe or subframes use the at least one linear modulation constellation. The associated data is a bit pattern identifying which subframe or subframes use the at least one linear modulation constellation. The bit pattern can comprise a single bit or a number of bits to represent a respective linear modulation constellation or respective linear modulation constellations.

Furthermore, additionally or alternatively, at least the EPDCCH can have associated data to provide an indication of which EPDCCH resources use the at least one linear modulation constellation. The associated data can be a bit pattern identifying which EPDCCH resources use the at least one linear m-ary modulation constellation. The bit pattern can comprise a single bit or a number of bits to represent a respective linear modulation constellation or respective linear modulation constellations.

A further embodiment applying the foregoing is also described with reference to FIG. 1 as follows. The PDCCH 100 baseband signal is formed by a multiplexer 102 multiplexing a block of bits 104. In particular, the multiplexor 102 multiplexes the block of bits 104 $b^{(i)}(0), \ldots, b^{(i)}(M_{bit}^{(i)}-1)$, where $M_{bit}^{(i)}$ is the number of bits in one subframe to be transmitted on a PDCCH number i resulting in a multiplexed block of bits $b^{(0)}(0), \ldots, b^{(0)}(M_{bit}^{(0)}-1) \cdot b^{(1)}(0), \ldots, (M_{bit}^{(1)}-1), \ldots, b^{(nPDCCH-1)}(0), \ldots b^{(nPDCCH-1)}(M_{bit}^{(nPDCCH-1)}-1)$ where $n_{PDCCH}-1$ is the number of PDCCHs transmitted in the subframe.

The block of bits $b^{(0)}(0), \ldots, b^{(0)}(M_{bit}^{(0)}-1)$, $b^{(1)}(0), \ldots, b^{(1)}(M_{bit}^{(1)}-1), \ldots, b^{(nPDCCH-1)}(0), \ldots, b^{(nPDCCH-1)}(M_{bit}^{(nPDCCH-1)}-1)$ is scrambled using a scrambler 106 with a cell-specific sequence prior to modulation, resulting in a block of scrambled bits $\tilde{b}(0), \ldots, \tilde{b}(M_{tot}-1)$ according to $\tilde{b}(i)=(b(i)+c(i)) \bmod 2$ where a scrambling sequence c(i) is given by section 7.2 of 3GPP TS 36.211v11.0.0. A scrambling sequence generator (not shown) of the scrambler can be initialized with $c_{init}=\lfloor n_s/2 \rfloor 2^9+N_{ID}^{cell}$ at the start of each subframe.

Control Channel Elements (CCE) number n corresponds to bits b(72n), b(72n+1), . . . , b(72n+71). If necessary, <NIL> elements can be inserted in the block of bits prior to scrambling to ensure that the PDCCHs start, or a PDCCH starts, at the CCE positions as described in 3GPP TS 36.213: "Evolved Universal Terrestrial Radio Access (E-UTRA): Physical layer procedures, v11.04.00 or v11.00.00 and to ensure that the length $M_{tot}=8N_{REG} \geq \sum_{i=0}^{nPDCCH-1} M_{bit}^{(i)}$ of the scrambled block of bits matches the amount of resource element groups not yet assigned to a Physical Control Format Indicator Channel (PCFICH) or a Physical hybrid-ARQ Indicator Channel (PHICH).

The block of scrambled bits $\tilde{b}(0), \ldots, \tilde{b}(M_{tot}-1)$ is modulated by a modulator 108 according to the following modulation table 4

TABLE 4

4-PAM modulation mapping

| b(i), b(i + 1) | I | Q |
|---|---|---|
| 00 | $3/\sqrt{5}$ | 0 |
| 01 | $1/\sqrt{5}$ | 0 |
| 10 | $-1/\sqrt{5}$ | 0 |
| 11 | $-3/\sqrt{5}$ | 0 | which results a block of linearly modulated modulation symbols $d(0), \ldots, d(M_{symb}-1)$, albeit with the quadrature values or imaginary values set to zero.

The block of modulation symbols is mapped, by a Layer Mapper 110, according to one of sections 6.3.3.1 or section 6.3.3.3 of 3GPP TS 36.211v11.0.0 and then precoded, by a Precoder 112, according to sections 6.3.4.1 or 6.3.4.3, which results in a block of vectors $y(i)=[y^{(0)}(i) \ldots y^{(P-1)}(i)]^T$, $i=0, \ldots M_{symb}-1$ to be mapped onto resources on the antennas used for transmission, where $y^{(p)}(i)$ represents the signal for antenna port p.

The block of vectors is mapped, by a resource element mapper 114, in a manner defined by operations on quadruplets of complex-valued symbols as follows:

Let $z^{(p)}(i) = \langle y^{(p)}(4i), y^{(p)}(4i+1), y^{(p)}(4i+2), y^{(p)}(4i+3) \rangle$ denote symbol quadruplet i for antenna port p.

The block of quadruplets $z^{(p)}(0), \ldots, z^{(p)}(M_{quad}-1)$ where $M_{quad}=M_{symb}/4$ can be permuted resulting in $w^{(p)}(0), \ldots, w^{(p)}(M_{quad}-1)$. The permutation can be according to the sub-block interleaver section 5.1.4.2.1 of 3GPP TS 36.212: "Evolved Universal Terrestrial Radio Access (E-UTRA); Multiplexing and channel coding", v11.0.0 or v11.03.00, subject to the following exceptions:

- the input and output to the interleaver is defined by symbol quadruplets instead of bits
- interleaving is performed on symbol quadruplets instead of bits by substituting the terms "bit", "bits" and "bit sequence" in section 5.1.4.2.1 of 3GPP TS 36.212: "Evolved Universal Terrestrial Radio Access (E-UTRA); Multiplexing and channel coding", v11.0.0 or v11.03.00 by "symbol quadruplet", "symbol quadruplets" and "symbol-quadruplet sequence" respectively.
- <NULL> elements at the output of the interleaver in 3GPP TS 36.212: "Evolved Universal Terrestrial Radio Access (E-UTRA); Multiplexing and channel coding", v11.0.0 or v11.03.00 can be removed when forming $w^{(p)}(0), \ldots, w^{(p)}(M_{quad}-1)$. Removing the <NULL> elements does not affect any <NIL> elements inserted as indicated above.

The block of quadruplets $w^{(p)}(0), \ldots, w^{(p)}(M_{quad}-1)$ is cyclically shifted, resulting in $\overline{w}^{(p)}(0), \ldots, \overline{w}^{(p)}(M_{quad}-1)$, where $\overline{w}^{(p)}((i+N_{ID}^{cell}) \bmod M_{quad})$.

Mapping of the block of quadruplets $\overline{w}^{(p)}(0), \ldots, \overline{w}^{(p)}(M_{quad}-1)$ is defined in terms of resource-element groups specified in section 6.2.4 of 3GPP TS 36.211v11.0.0, according to the following:

(1) Initialise m'=0, which is the resource-element group number
(2) Initialise k'=0
(3) Initialise l'=0
(4) If the resource element (k',l') represents a resource-element group and the resource-element group is not assigned to PCFICH or PHICH then perform step (5) and (6), else go to step (7)
(5) Map symbol-quadruplet $\overline{w}^{(p)}(m')$ to the resource-element group represented by (k',l') for each antenna port p.
(6) Increase m' by 1
(7) Increase l' by 1
(8) Repeat from step (4) if l'<L, where L corresponds to the number of OFDM symbols used for PDCCH transmission as indicated by the sequence transmitted on the PCFICH.
(9) Increase k' by 1
(10) Repeat from step (3) if $k'<N_{RB}^{DL} \cdot N_{SC}^{RB}$.

An OFDM signal generator 116 can be used to produce a time-continuous signal $s_l^{(p)}(t)$, on antenna port p in OFDM symbol l in a downlink slot, defined by $$s_l^{(p)}(t) = \sum_{k=-\lfloor N_{RB}^{DL} N_{sc}^{RB}/2 \rfloor}^{-1} a_{k^{(-)},l}^{(p)} e^{j2\pi k \Delta f(t-N_{CP,l}T_s)} + \sum_{k=1}^{\lceil N_{RB}^{DL} N_{sc}^{RB}/2 \rceil} a_{k^{(+)},l}^{(p)} e^{j2\pi k \Delta f(t-N_{CP,l}T_s)}$$

for $0 \leq t < (N_{CP,l}+N)T_s$, where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor-1$. The variable N equals 2048 for $\Delta f=15$ kHz subcarrier spacing and 4096 for $\Delta f=7.5$ kHz subcarrier spacing.

The OFDM symbols in a slot are transmitted in increasing order of l, starting with l=0, where OFDM symbol l>0 starts at time $\Sigma_{l'=0}^{l-1}(N_{CP,l'}+N)T_s$ within the slot. An embodiment provides, additionally, for the starting position of the OFDM symbols with an extended cyclic prefix to be identical to those in a slot where all OFDM symbols use an extended cyclic prefix in the case where the first OFDM symbol in a slot uses, or the first OFDM symbols in a slot use, a normal cyclic prefix and the remaining OFDM symbols use an extended cyclic prefix. Table 5 below lists the value of $N_{CP,l}$ that can be used. It should be noted that different OFDM symbols within a slot in some cases can have different cyclic prefix lengths.

TABLE 5

| Configuration | | Cyclic prefix length $N_{CP,l}$ |
|---|---|---|
| Normal cyclic prefix | Δf = 15 kHz | 160 for l = 0 |
| | | 144 for l = 1, 2, . . . , 6 |
| Extended cyclic prefix | Δf = 15 kHz | 512 for l = 1, 2, . . . , 5 |
| | Δf = 7.5 kHz | 1024 for l = 0, 1, 2 |

Figure 4:
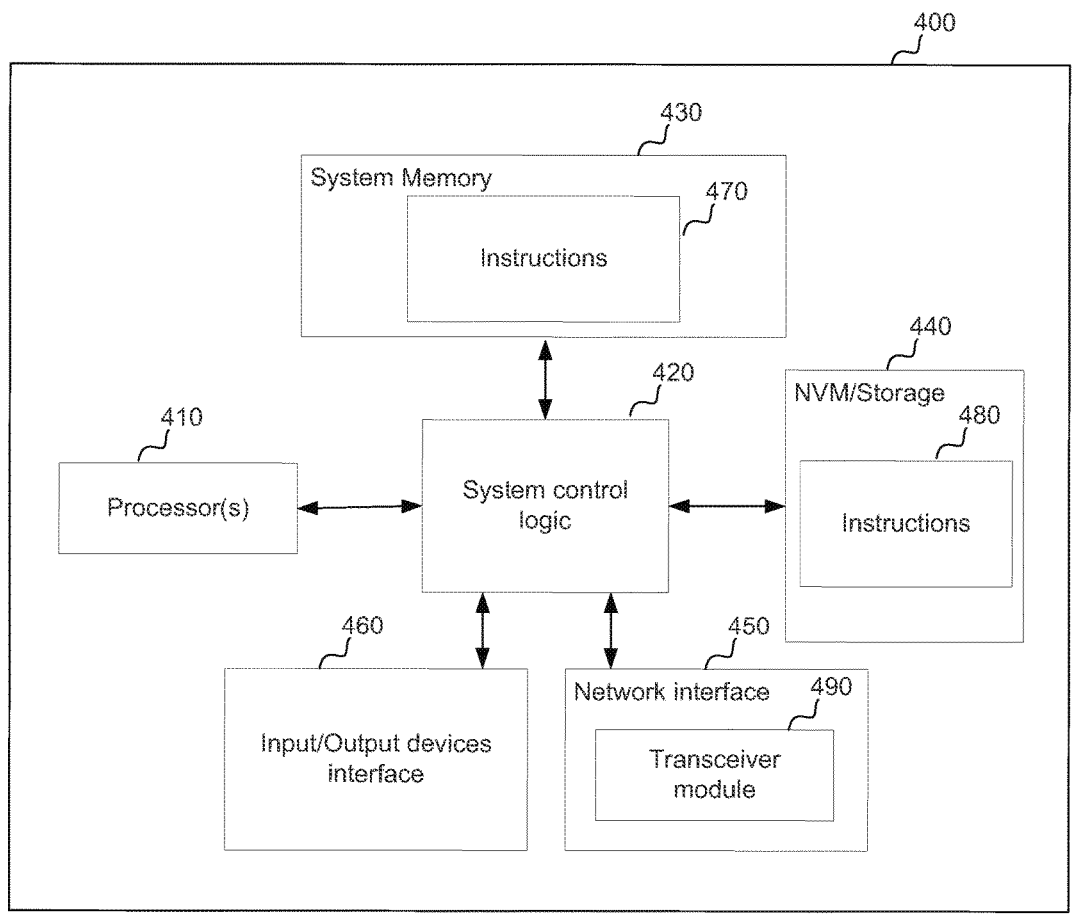
FIG. 4 depicts a UE.

FIG. 4 illustrates, for one embodiment, an example system 400 comprising one or more processor(s) 410 and system control logic 420 coupled with at least one of the processor(s) 410, system memory 430, non-volatile memory (NVM)/storage 440, a network interface 450 and an Input/Output devices interface 460, taken jointly and severally in any and all permutations. The system is arranged to realise the processing described herein.

Processor(s) 410 may include one or more single-core or multi-core processors. Processor(s) 410 may include any combination of general-purpose processors and/or dedicated processors (e.g., graphics processors, application processors, baseband processors, etc.). Processors 410 may be operable to carry out the above described signal processing using suitable instructions or programs (i.e. operate via use of processor or other logic, instructions) 470. The instructions 470 may be stored in system memory 430, or additionally or alternatively may be stored in (NVM)/storage 440, as NVM instructions 480.

The system control logic 420 for one embodiment may include any suitable interface controllers to provide for any suitable interface to at least one of the processor(s) 410 and/or to any suitable device or component in communication with the system control logic 430.

The system control logic 430 for one embodiment may include one or more memory controller(s) to provide an interface to system memory 430. System memory 430 may be used to load and store data and/or instructions, for example, for system 400. System memory 430 for one embodiment may include any suitable volatile memory, such as suitable dynamic random access memory (DRAM), for example.

NVM/storage 440 may include one or more tangible, non-transitory computer-readable media used to store data and/or instructions, for example. NVM/storage 440 may include any suitable non-volatile memory, such as flash memory or Read Only Memory (ROM), for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 440 may include a storage resource physically part of a device on which the system 400 is use or it may be accessible by, but not necessarily a part of, the device. For example, the NVM/storage 440 may be accessed over a network via the network interface 450. Embodiments can be provided in which the network interface comprises a transceiver module 490 for at least one of transmitting and receiving signals in wired or wireless form.

System memory 430 and NVM/storage 440 may respectively include, in particular, temporal and persistent copies of, for example, the instructions 470 and 480, respectively. Instructions 470 and 480 may include instructions that when executed by at least one of the processor(s) 410 result in the system 400 implementing a one or of the methods, such as the methods shown in and described with reference to in FIGS. 7 and 9, or the method(s) of any other embodiment, as described herein. In some embodiments, instructions 470 and 480, or hardware, firmware, and/or software components thereof, may additionally/alternatively be located in the system control logic 420, the network interface 450, and/or the processor(s) 410.

Network interface 450 may have a transceiver module 490 to provide a radio interface for the system 400 to communicate over one or more network(s) (e.g. wireless communication network) and/or with any other suitable device. The transceiver 490 may be implemented as in a manner that performs the above processing of the received signals to realise interference mitigation. In various embodiments, the transceiver 490 may be integrated with other components of system 400. For example, the transceiver 490 may include a processor of the processor(s) 410, memory of the system memory 430, and NVM/Storage of NVM/Storage 440. Network interface 450 may include any suitable hardware and/or firmware. Network interface 450 may be operatively coupled to a plurality of antennas (not shown) to provide a multiple input, multiple output radio interface. Network interface 450 for one embodiment may include, for example, a network adapter, a wireless network adapter, a telephone modem, and/or a wireless modem.

For one embodiment, at least one of the processor(s) 410 may be packaged together with logic for one or more controller(s) of system control logic 420. For one embodiment, at least one of the processor(s) 410 may be packaged together with logic for one or more controllers of system control logic 420 to form a System in Package (SiP). For one embodiment, at least one of the processor(s) 410 may be integrated on the same die with logic for one or more controller(s) of system control logic 420. For one embodiment, at least one of the processor(s) 410 may be integrated on the same die with logic for one or more controller(s) of system control logic 420 to form a System on Chip (SoC).

In various embodiments, the I/O devices interface 460 may include user interfaces designed to enable user interaction with the system 400, peripheral component interfaces designed to enable peripheral component interaction with the system 400, and/or sensors designed to determine environmental conditions and/or location information related to the system 400.

Figure 5:
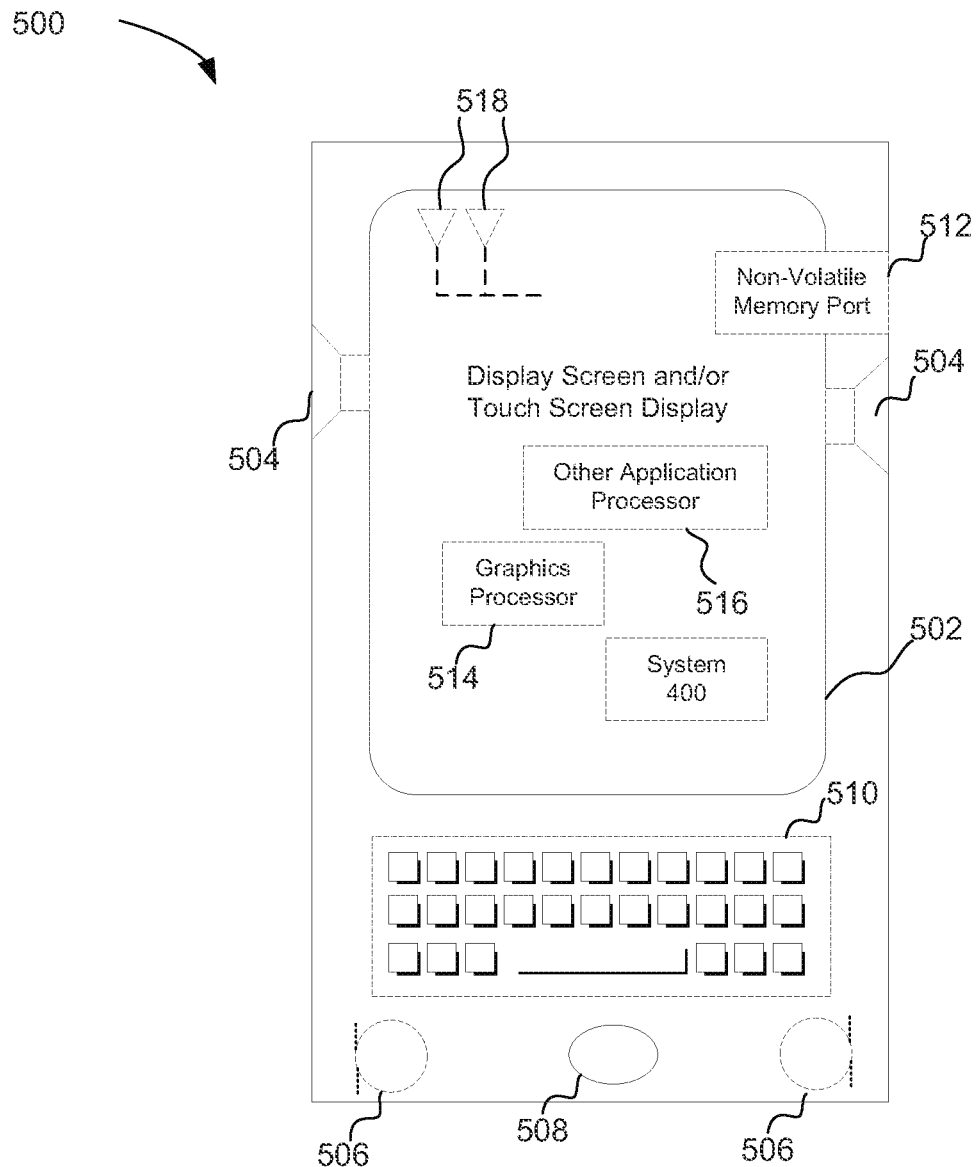
FIG. 5 illustrates a UE.

FIG. 5 shows an embodiment in which the system 400 is used to realise a UE in form of a mobile device 500.

In various embodiments, the user interfaces could include, but are not limited to, a display 502 (e.g., a liquid crystal display, a touch screen display, etc.), a speaker 504, a microphone 506, one or more cameras 508 (e.g., a still camera and/or a video camera), a flashlight (e.g., a light emitting diode flash), and a keyboard 510.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 450 to communicate with components of a positioning network, e.g., a global positioning system (GPS) satellite.

In various embodiments, the system 400 may be a mobile computing device such as, but not limited to, a laptop computing device, a tablet computing device, a netbook, a mobile phone, etc. In various embodiments, system 400 may have more or less components, and/or different architectures. Additionally, the mobile device 500 may comprise a memory port 512 for receiving additional memory (not shown), a graphics processor 514 and/or an application processor 516. The mobile device can comprise one, or more than one, antenna 518.

Figure 6:
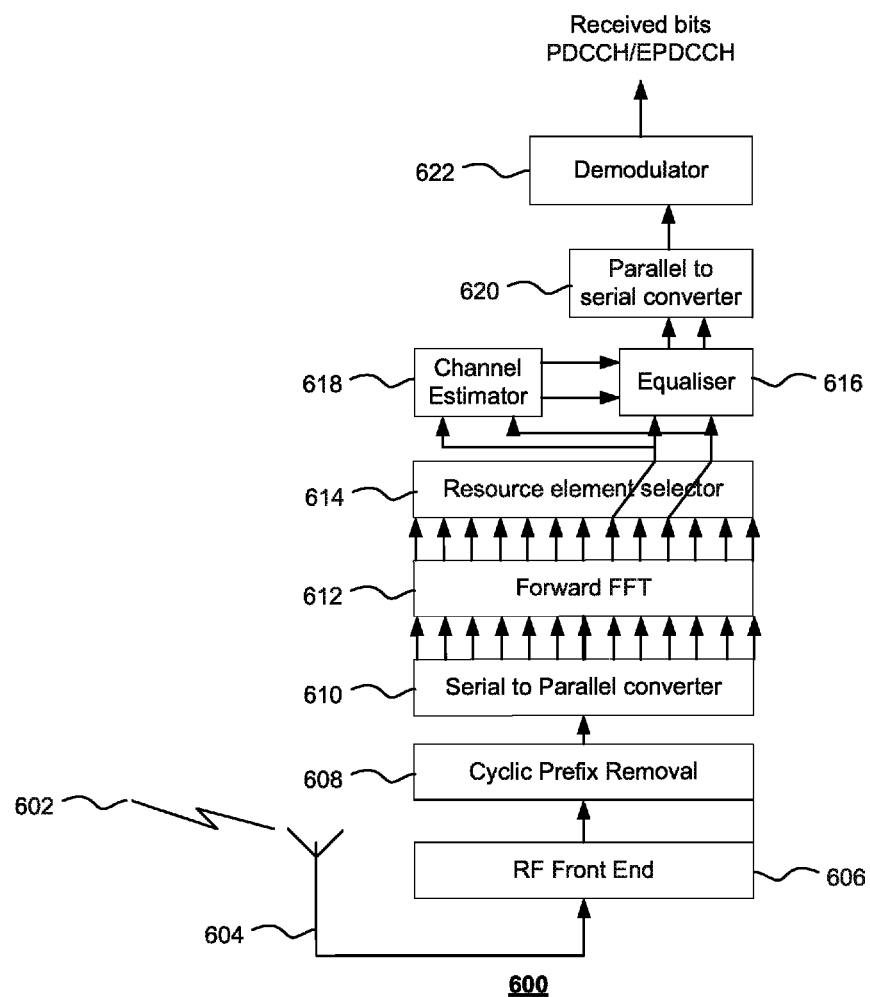
FIG. 6 shows a view of a part of a UE for processing a received signal.

Referring to FIG. 6, there is shown schematically a view 600 of a UE for processing a received signal according to an embodiment. A signal 602 transmitted by, for example, an eNB (not shown but described hereafter with respect to FIGS. 8 and 9) is received via at least one antenna 604, and, in some examples, received by multiple antennas. The received signal 602 is processed by an RF front end 606. The RF front end can comprise, for example, a filter (not shown) for filtering the received signal 602 and a Low Noise Amplifier (not shown).

A cyclic prefix removal module 608 is arranged to remove the above mentioned cyclic prefixes. The cyclic prefix removal module is an embodiment of a cyclic prefix remover. The signal is then passed through a serial to parallel converter 610. The symbols output by the serial to parallel converter 610 are processed by a forward Fast Fourier Transform module 612. The output of the FFT module 612 is passed to a resource element selector 614, which selects the radio resources intended for, or of interest to, the receiving UE for further processing and can ignores other radio resources since they are typically intended for other UEs.

The selected radio resources are processed by an equaliser 616 and a channel estimator 618. The channel estimator 618 processes the selected radio resources with a view to influencing the operation of the equaliser 616. The output of the equaliser 616 is converted into serial form, via a parallel to serial converter 620. The parallel signals are then processed by a demodulator 622 that is adapted to demodulate the linear m-ary modulated data to recover at least one of, and perhaps both of, the PDCCH and the EPDCCH, as indicated above. It will be appreciated that at least one or more of the RF front end 606, cyclic prefix module 608, serial to parallel converter 610, FFT module 612, resource element selector 614, equaliser 616, channel estimator 618, parallel to serial converter 620 and demodulator, taken jointly and severally in any and all combinations, are examples of processing elements.

Figure 7:
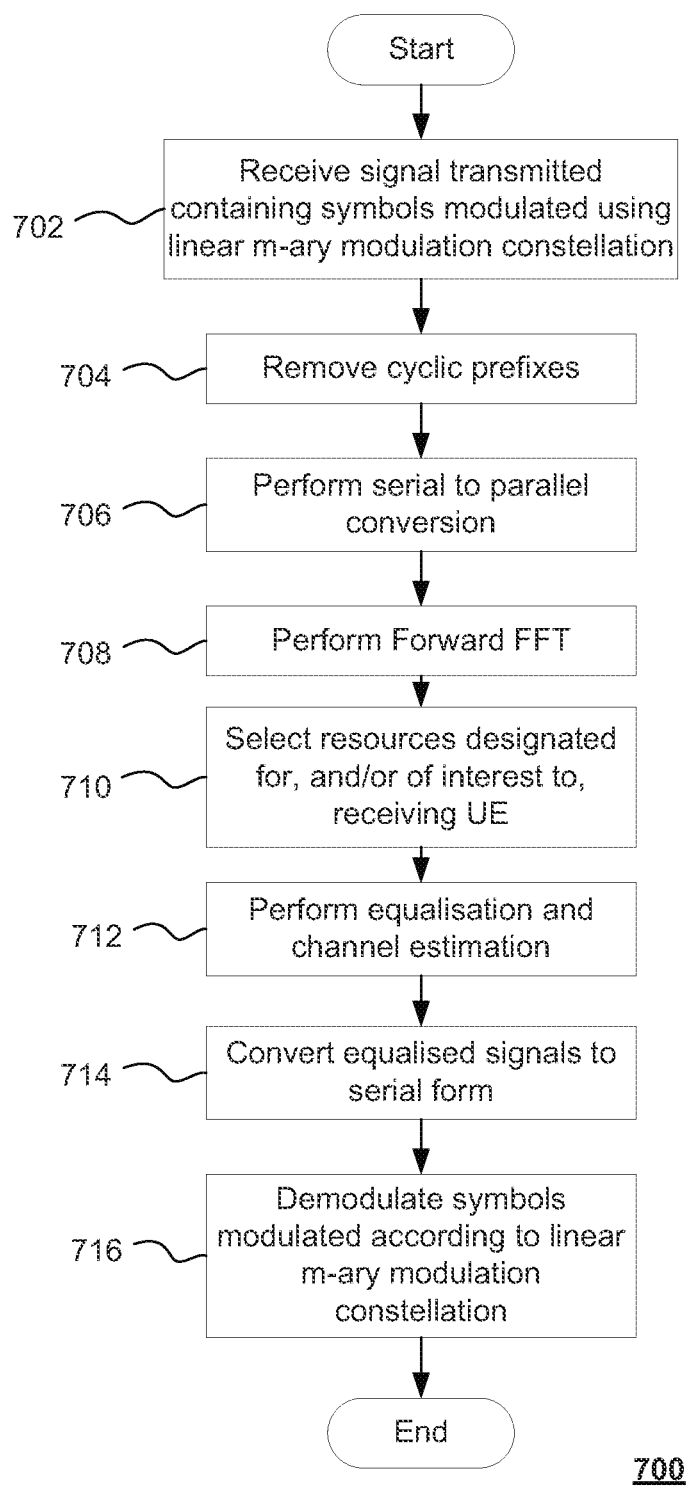
FIG. 7 shows a flowchart of processing operations of a UE.

FIG. 7 is a flowchart 700 depicting processing undertaken by UE according to embodiments. The signal 602 containing symbols modulated using one of the above linear m-ary modulation constellations is received at 702. The normal and/or extended cyclic prefixes are removed at 704 prior to serial to parallel conversion at 706. The resulting parallel symbols are subjected to a forward FFT at 708. The output of the FFT 612 is processed by the resource element selector at 710 to select those radio resources that are designated for, and/or of interest to, the receiving UE 600. Equalisation, with or without channel estimation, is undertaken at 712. The equalised selected radio resources are output for parallel to serial conversion at 714 and demodulated at 716 according to one of the linear m-ary modulation constellations described above.

Figure 8:
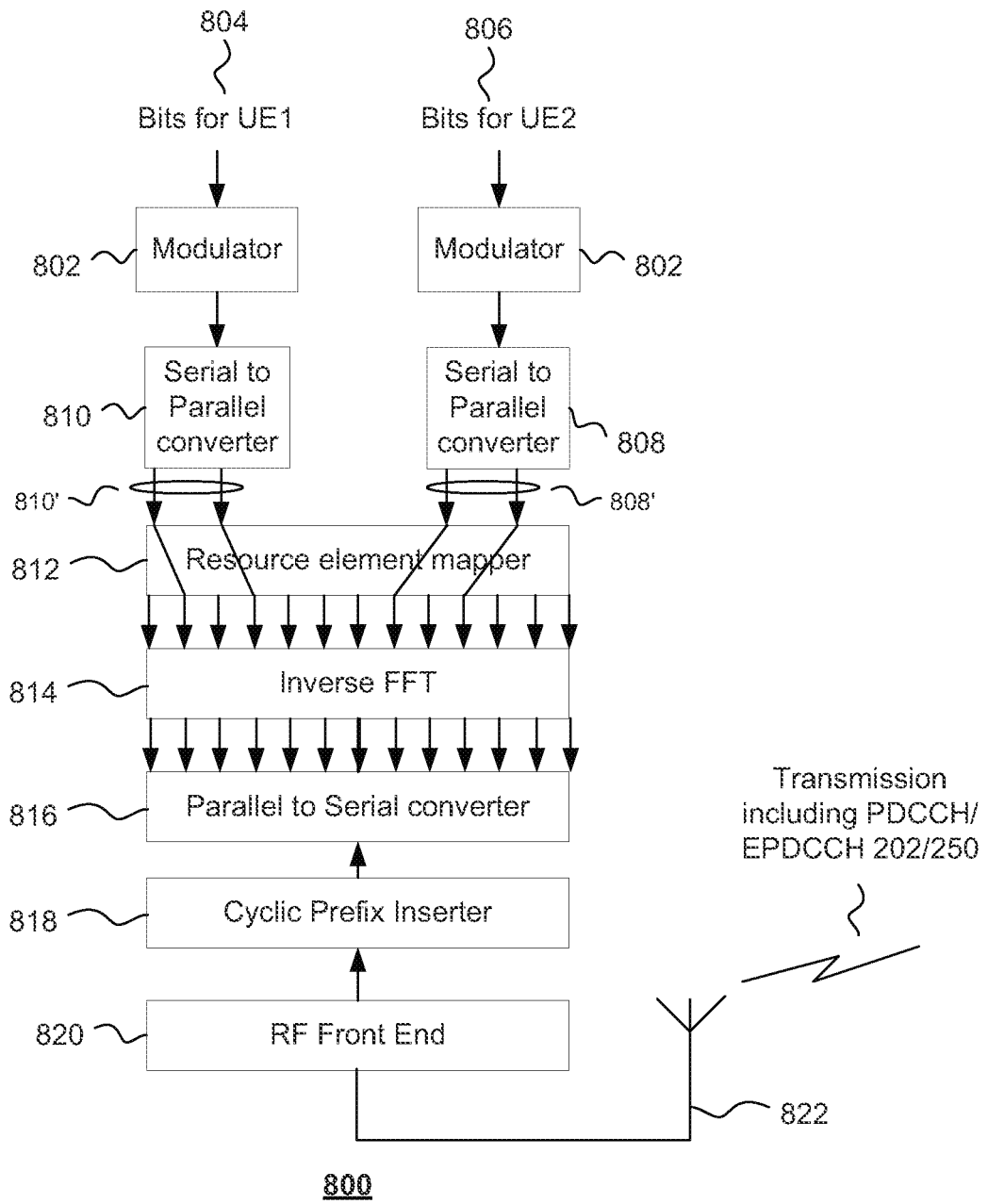
FIG. 8 shows a view of an eNode B (eNB)

FIG. 8 shows a view of an eNB transmitter 800. The eNB 800 comprises one or more than one modulator 802. In FIG. 8, it is assumed that the eNB 800 is sending data to two UEs. Therefore, a pair of modulators 802 is shown. However, some other number of modulators could be used; such an other number being fixed or variable according to a number of UEs being served by the eNB 800. The modulators 802 are operable independently of one another and can use the same or different modulation constellations. The modulators 802 are arranged to modulate data for respective UEs. A first set 804 of data is destined for a first UE, UE1. A second set 806 of data is destined for a second UE, UE2. The modulators are arranged, when the input data 804 and/or 806 form part of at least one of a PDCCH and a EPDCCH, to modulate the data according to at least one of the above linear m-ary modulation constellations.

The modulated data is output to respective serial to parallel converters 808 and 810 for conversion into a number of sub-streams of parallel modulated data 810' and 810'. The number of sub-streams has been illustrated as two per UE. However, it will be appreciated that some other number of sub-streams could be used for one or more of the UEs. The number of sub-streams allocated to a UE can vary according to anticipated data rate.

The parallel sub-streams are input to a resource element mapper 812 that maps the sub-streams onto respective subcarriers using an Inverse Fast Fourier Transform (IFFT) 814. The parallel output data from the IFFT 814, representing OFDM symbols, is converted, by a parallel to serial converter 816, into a stream of OFDM symbols and a cyclic prefix inserter 818 is arranged to insert a cyclic prefix as described above before transmission of the symbols via an RF front end 820 and a respective antenna 822. The cyclic prefix inserter 818 is an embodiment of an inserter.

As indicated above, the modulators 802 can be adapted according to channel conditions and can selectively change modulation constellations, that is, modulation schemes, according to channel conditions. In particular, embodiments use the above linear m-ary modulation constellation for at least one of the PDCCH and EPDCCH. The linear m-ary modulation constellation can be used for all of the PDCCH and/or EPDCCH or used according to prevailing or detected interference conditions for interference mitigation.

Figure 9:
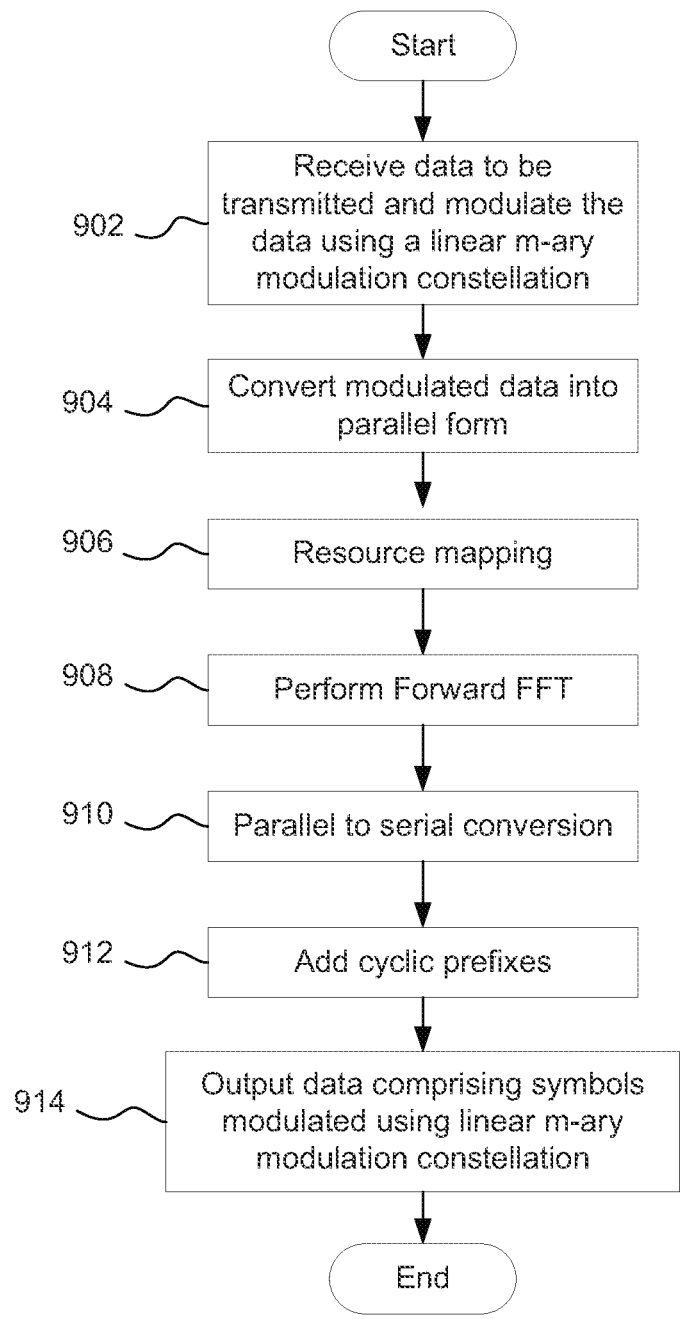
FIG. 9 shows a flowchart of processing of an eNB.

Referring to FIG. 9, there is shown a flowchart 900 of example processing undertaken by the eNB 800. The UE data to be modulated, that is, at least one of the data for forming the PDCCH and EPDCCH, is received at 902 and modulated according to one of the above described linear m-ary modulation constellations. The modulated data is converted into parallel sub-streams at 904. The parallel sub-streams are mapped onto allocated radio resources at 906 and the mapped sub-streams are mapped onto respective sub-carriers, or OFDM symbols, at 908. The OFDM symbols are converted from parallel form to a serial stream at 910 and respective cyclic prefixes are added at 912. The OFDM symbols plus their cyclic prefixes are output for transmission at 914.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, as a FPGA, or an ASIC, which together constitute embodiments of processing circuitry configured to or configurable to perform the functions of the above examples and embodiments. Any such hardware can also take the form of a chip or chip set arranged to operate according to any one or more of the above described diagrams, such diagrams and associated descriptions being taken jointly or severally in any and all permutations.

Although the above example and embodiments have been described separately with respect to their accompanying drawings, embodiments are not limited thereto. Embodiments can be realised in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such an enumerated list are contemplated, which is only made more emphatic by the accompanying language "taken jointly and severally in any all permutations".

Various embodiments can be realised according to the following clauses:

Clause 1: An apparatus for interference mitigation in a wireless communication, the apparatus comprising:
at least one processing element arranged to extract, from a received PDCCH or EPDCCH signal, modulated symbols; the modulated symbols having been modulated using a linear m-ary modulation constellation; and
a demodulator to demodulate the extracted PDCCH or EPDCCH modulated symbols; the demodulator being operable to demodulate the extracted symbols according to the linear m-ary modulation constellation.

Clause 2: The apparatus of clause 1, in which the demodulator is operable according to a linear m-ary modulation constellation having a variable I channel component and a fixed Q channel component, or a variable Q channel component and a fixed I channel component.

Clause 3: The apparatus of either of clauses 1 and 2, in which the linear m-ary modulation constellation comprises a set of IQ modulation points that are linear.

Clause 4: The apparatus of any preceding clause, in which the linear m-ary modulation constellation is arranged to map a number of data units to respective linear IQ modulation constellation points.

Clause 5: The apparatus of any preceding clause, in which the linear m-ary modulation constellation comprises a first set of first channel values and a first set of second channel values.

Clause 6: The apparatus of clause 5, in which the first set of first channel values of the first set of second channel values are zero with the other set of channel values being non-zero.

Clause 7: An apparatus of any preceding clause, in which at least the PDCCH has associated data for indicating which subframe or subframes use the at least one linear m-ary modulation constellations.

Clause 8: An apparatus of clause 7, wherein the associated data is a bit pattern identifying which subframe or subframes use the at least one linear m-ary modulation constellation.

Clause 9: An apparatus of any preceding clause, in which at least the EPDCCH has associated data to provide an indication of which EPDCCH resources use the at least one linear m-ary modulation constellation.

Clause 10: An apparatus of clause 8, wherein the associated data is a bit pattern identifying which EPDCCH resources use the at least one linear m-ary modulation constellation.

Clause 11: The apparatus of any preceding clause, further comprising at least one of (a) at least one antenna for receiving the PDCCH or EPDCCH, (b) a screen for outputting data, (c) a keyboard for inputting data or operating the apparatus and (b) an audio output device.

Clause 12: An eNB for interference mitigation wireless communication, the eNB comprising
a modulator for receiving UE data to be transmitted to a UE; the UE data representing data of at least one of a PDCCH and a EPDCCH; the modulator being configurable to operate according to a linear m-ary modulation constellation to modulate the data of the at least one PDCCH and EPDCCH according to the linear m-ary modulation constellation and output modulated data;
a resource mapper arranged to map the modulated data onto allocated subcarriers;
a subcarrier modulator for receiving the mapped modulated data and outputting respective subcarriers associated with the mapped modulated data.

Clause 13: An eNB of clause 12, further comprising an inserter for adapting the respective subcarriers to mitigate inter-symbol interference.

Clause 14: An eNB of either of clauses 12 and 13, further comprising at least one antenna and an RF transmitter for transmitting the adapted subcarriers.

Clause 15: An eNB of in any of clauses 12 to 14, wherein the linear m-ary modulation constellation comprises a set of constellation points that are all linearly disposed.

Clause 16: An eNB of clause 15 in which the linear m-ary modulation constellation is a Pulse Amplitude Modulation constellation.

Clause 17: An eNB of any of clauses 12 to 16, in which at least the PDCCH has associated data for indicating which subframe or subframes use the at least one linear m-ary modulation constellations.

Clause 18: An eNB of clause 17, wherein the associated data is a bit pattern identifying which subframe or subframes use the at least one linear m-ary modulation constellation.

Clause 19: An eNB of any of clauses 12 to 18, in which at least the EPDCCH has associated data to provide an indication of which EPDCCH resources use the at least one linear m-ary modulation constellation.

Clause 20: An eNB of clause 19, wherein the associated data is a bit pattern identifying which EPDCCH resources use the at least one linear m-ary modulation constellation.

Clause 21: A User Equipment comprising:
a cyclic prefix remover for removing at least one cyclic prefix from a received signal; the received signal being a downlink control signal comprising OFDM symbols modulated with a linear modulation constellation; the cyclic prefix remover being arranged to output the OFDM symbols without the at least one cyclic prefix;

a serial to parallel converter for receiving the OFDM symbols and outputting an associated a plurality of sub-carriers;

a transformer for Fourier transforming the associated plurality of sub-carriers to a further plurality of subcarriers;

a resource selector for selecting one or more than one of the further subcarriers for demodulation and outputting any selected further subcarriers for demodulation;

a demodulator for demodulating any output selected further subcarriers according to the linear modulation constellation.

Clause 22: A UE of clause 21, in which the linear modulation constellation comprises a plurality of linearly disposed points.

Clause 23: A method of demodulating a received PDCCH or EPDCCH signal comprising OFDM data modulated using a linear modulation constellation for interference mitigation;

the method comprising:

receiving a PDCCH or EPDCCH signal comprising OFDM control data modulated using a linear modulation constellation;

removing any cyclic prefixes associated with the OFDM control data;

Fourier transforming the OFDM control data; and demodulating the Fourier transformed OFDM control data according to the linear modulation constellation and outputting corresponding data.

Clause 24: The method of clause 23, in which linear modulation constellation comprises I and Q components representing constellation points that are all linearly disposed.

Clause 25: An apparatus for demodulating a received PDCCH or EPDCCH signal comprising OFDM data modulated using a linear modulation constellation for interference mitigation; the apparatus comprising:

means to receive a PDCCH or EPDCCH signal comprising OFDM control data modulated using a linear modulation constellation;

means to remove any cyclic prefixes associated with the OFDM control data;

means to Fourier transform the OFDM control data; and means to demodulate the Fourier transformed OFDM control data according to the linear modulation constellation and outputting corresponding data.

Clause 26: The apparatus of clause 25, in which linear modulation constellation comprises I and Q components representing constellation points that are all linearly disposed.

Clause 27: An apparatus for interference mitigation in a wireless communication, the apparatus comprising:

means to extract, from a received PDCCH or EPDCCH signal, modulated symbols; the modulated symbols having been modulated using a linear m-ary modulation constellation; and means to demodulate the extracted PDCCH or EPDCCH modulated symbols; the demodulator being operable to demodulate the extracted symbols according to the linear m-ary modulation constellation.

Clause 28: The apparatus of clause 27, in which the means to demodulate is operable according to a linear m-ary modulation constellation having a variable I channel component and a fixed Q channel component, or a variable Q channel component and a fixed I channel component.

Clause 29: The apparatus of either of clauses 27 and 28, in which the linear m-ary modulation constellation comprises a set of IQ modulation points that are linear.

Clause 30: The apparatus of clauses 27 to 29, in which the linear m-ary modulation constellation is arranged to map a number of data units to respective linear IQ modulation constellation points.

Clause 31: The apparatus of any of clauses 27 to 30, in which the linear m-ary modulation constellation comprises a first set of first channel values and a first set of second channel values.

Clause 32: The apparatus of clause 31, in which the first set of first channel values of the first set of second channel values are zero with the other set of channel values being non-zero.

Clause 33: An apparatus of any of clauses 27 to 32, in which at least the PDCCH has associated data for indicating which subframe or subframes use the at least one linear m-ary modulation constellations.

Clause 34: An apparatus of clause 33, wherein the associated data is a bit pattern identifying which subframe or subframes use the at least one linear m-ary modulation constellation.

Clause 35: An apparatus of any of clauses 27 to 34, in which at least the EPDCCH has associated data to provide an indication of which EPDCCH resources use the at least one linear m-ary modulation constellation.

Clause 36: An apparatus of clause 35, wherein the associated data is a bit pattern identifying which EPDCCH resources use the at least one linear m-ary modulation constellation.

Clause 37: The apparatus of any of clauses 27 to 36, further comprising at least one of (a) at least one antenna for receiving the PDCCH or EPDCCH, (b) a screen for outputting data, (c) a keyboard for inputting data or operating the apparatus and (b) an audio output device.

Clause 38: An eNB for interference mitigation wireless communication, the eNB comprising a modulator for receiving UE data to be transmitted to a UE; the UE data representing data of at least one of a PDCCH and a EPDCCH; the modulator being configurable to operate according to a linear m-ary modulation constellation to modulate the data of the at least one PDCCH and EPDCCH according to the linear m-ary modulation constellation and output modulated data;

a resource mapper arranged to map the modulated data onto allocated subcarriers;

a subcarrier modulator for receiving the mapped modulated data and outputting respective subcarriers associated with the mapped modulated data.

Clause 39: An eNB of clause 38, further comprising an inserter for adapting the respective subcarriers to mitigate inter-symbol interference.

Clause 40: An eNB of clause 39, further comprising at least one antenna and an RF transmitter for transmitting the adapted subcarriers.

Clause 41: An eNB of any of clauses 38 to 40, wherein the linear m-ary modulation constellation comprises a set of constellation points that are all linearly disposed.

Clause 42: An eNB of clause 41, in which the linear m-ary modulation constellation is a Pulse Amplitude Modulation constellation.

Clause 43: An eNB of any of clauses 38 to 42, in which at least the PDCCH has associated data for indicating which subframe or subframes use the at least one linear m-ary modulation constellations.

Clause 44: An eNB of clause 43, wherein the associated data is a bit pattern identifying which subframe or subframes use the at least one linear m-ary modulation constellation.

Clause 45: An eNB of any of clauses 38 to 44, in which at least the EPDCCH has associated data to provide an indication of which EPDCCH resources use the at least one linear m-ary modulation constellation.

Clause 46: An eNB of clause 45, wherein the associated data is a bit pattern identifying which EPDCCH resources use the at least one linear m-ary modulation constellation.

Clause 47: A User Equipment comprising:
a cyclic prefix remover for removing at least one cyclic prefix from a received signal; the received signal being a downlink control signal comprising OFDM symbols modulated with a linear modulation constellation; the cyclic prefix remover being arranged to output the OFDM symbols without the at least one cyclic prefix;
a serial to parallel converter for receiving the OFDM symbols and to output an associated a plurality of sub-carriers;
a transformer for Fourier transforming the associated plurality of sub-carriers to a further plurality of subcarriers;
a resource selector for selecting one or more than one of the further subcarriers for demodulation and outputting any selected further subcarriers for demodulation;
a demodulator for demodulating any output selected further subcarriers according to the linear modulation constellation.

Clause 48: A UE of clause 47, in which the linear modulation constellation comprises a plurality of linearly disposed points.

Clause 49: A signal comprising a PDCCH, the PDCCH comprising data modulated using a linear m-ary modulation constellation.

Clause 50: A signal of clause 49, in which the linear m-ary modulation constellation comprises a set of IQ modulation points that are linear.

Clause 51: A signal of either of clauses 49 and 50, in which the linear m-ary modulation constellation is arranged to map a number of data units to respective linear IQ modulation constellation points.

Clause 52: A signal of any of clauses 49 to 41, in which the linear m-ary modulation constellation comprises a first set of first channel values and a first set of second channel values.

Clause 53: A signal of any of clauses 49 to 52, in which the first set of first channel values of the first set of second channel values are zero with the other set of channel values being non-zero.

Clause 54: A signal of any of clauses 49 to 53, in which at least the PDCCH has associated data for indicating which subframe or subframes use the at least one linear m-ary modulation constellations.

Clause 55: A signal of clause 54, wherein the associated data is a bit pattern identifying which subframe or subframes use the at least one linear m-ary modulation constellation.

Clause 56: A signal of any of clauses 49 to 55, in which at least the EPDCCH has associated data to provide an indication of which EPDCCH resources use the at least one linear m-ary modulation constellation.

Clause 57: A signal of clause 56, wherein the associated data is a bit pattern identifying which EPDCCH resources use the at least one linear m-ary modulation constellation.

Clause 58: A non-transitory computer program product comprising machine readable storage storing a computer program having instructions arranged, when executed to implement a method or realise an apparatus, eNB or UE of any preceding clause.

Clause 59: An apparatus, system, method, or signal substantially as described herein with reference to and/or as illustrated in any one or more of the accompanying drawings.

The invention claimed is:

1. An eNode B ("eNB") for interference mitigation in a wireless communication, the eNB comprising:
a modulator to receive user equipment ("UE") data to be transmitted to a UE, the UE data representing data of a physical downlink control channel ("PDCCH") or an enhanced physical downlink control channel ("EPDCCH"); the modulator being configurable to operate according to a linear m-ary modulation constellation to modulate the data of the PDCCH or EPDCCH according to the linear m-ary modulation constellation and to output modulated data;
a resource mapper arranged to map the modulated data onto allocated subcarriers;
a subcarrier modulator to receive the mapped modulated data and output respective subcarriers associated with the mapped modulated data,
wherein the linear m-ary modulation constellation comprises a set of constellation points that are all linearly disposed.

2. The eNB of claim 1, further comprising an inserter to adapt the respective subcarriers to mitigate inter-symbol interference.

3. The eNB of claim 2, further comprising at least one antenna and a radio-frequency ("RF") transmitter to transmit the adapted subcarriers.

4. The eNB of claim 1, in which the linear m-ary modulation constellation is a Pulse Amplitude Modulation constellation.

5. The eNB of claim 1, wherein the PDCCH has associated data to indicate which subframe or subframes use the linear m-ary modulation constellation.

6. The eNB of claim 5, wherein the associated data comprises a bit pattern to identify which subframe or subframes use the linear m-ary modulation constellation.

7. The eNB of claim 1, wherein the EPDCCH has associated data to provide an indication of which EPDCCH resources use the linear m-ary modulation constellation.

8. The eNB of claim 7, wherein the associated data comprises a bit pattern to identify which EPDCCH resources use the linear m-ary modulation constellation.

9. A user equipment (UE) comprising:
a cyclic prefix remover to remove at least one cyclic prefix from a received signal; the received signal being a downlink control signal comprising orthogonal frequency division multiplexing ("OFDM") symbols modulated with a linear modulation constellation; the cyclic prefix remover being arranged to output the OFDM symbols without the at least one cyclic prefix;
a serial to parallel converter to receive the OFDM symbols and output an associated plurality of subcarriers;
a transformer to Fourier transform the associated plurality of subcarriers to a further plurality of sub carriers;
a resource selector to select one or more than one of the further plurality of subcarriers for demodulation and output any selected further subcarriers for demodulation; and
a demodulator to demodulate any output selected further subcarriers according to the linear modulation constellation,
wherein the linear modulation constellation comprises a plurality of linearly disposed points.

10. The UE of claim 9, in which the linear modulation constellation is a Pulse Amplitude Modulation constellation.

11. The UE of claim 9, in which the received signal comprises at least a physical downlink control channel ("PDCCH") having associated data for indicating which subframe or subframes thereof use the linear modulation constellation.

12. The UE of claim 11, wherein the associated data is a bit pattern identifying which subframe or subframes use the linear modulation constellation.

13. The UE of claim 9, in which the received signal comprises at least an enhanced physical downlink control channel ("EPDCCH") having associated data to provide an indication of which EPDCCH resources thereof use the linear modulation constellation.

14. The UE of claim 13, wherein the associated data is a bit pattern identifying which EPDCCH resources use the linear modulation constellation.

15. The UE of claim 9, further comprising (a) at least one antenna for receiving a physical downlink control channel ("PDCCH") or an enhanced physical downlink control channel ("EPDCCH"), (b) a screen to output data, (c) a keyboard to input data or operate an apparatus, or (d) an audio output device.

16. A method of demodulating a received physical downlink control channel ("PDCCH") or an enhanced physical downlink control channel ("EPDCCH") signal comprising orthogonal frequency division multiplexing ("OFDM") data modulated using a linear modulation constellation for interference mitigation; the method comprising:
receiving a PDCCH or EPDCCH signal comprising OFDM control data modulated using a linear modulation constellation;
removing any cyclic prefixes associated with the OFDM control data;
Fourier transforming the OFDM control data; and
demodulating the Fourier transformed OFDM control data according to the linear modulation constellation and outputting corresponding data,
the linear modulation constellation comprises I and Q components representing constellation points that are all linearly disposed.

17. A non-transitory computer program product comprising machine-readable storage storing a computer program having instructions arranged, when executed, to implement the method of claim 16.

18. A non-transitory computer program product comprising machine-readable storage storing a computer program having instructions arranged, when executed, to cause an eNode B ("eNB") to:
receive user equipment ("UE") data to be transmitted to a UE, the UE data representing data of a physical downlink control channel ("PDCCH") or an enhanced physical downlink control channel ("EPDCCH");
modulate the data of the PDCCH or EPDCCH according to a linear m-ary modulation constellation and to output modulated data;
map the modulated data onto allocated subcarriers; and
receive the mapped modulated data and output respective subcarriers associated with the mapped modulated data,
wherein the linear m-ary modulation constellation comprises a set of constellation points that are all linearly disposed.

19. The non-transitory computer program product of claim 18, wherein the instructions, when executed, further cause the eNB to adapt the respective subcarriers to mitigate inter-symbol interference.

20. The non-transitory computer program product of claim 18, wherein the linear m-ary modulation constellation is a Pulse Amplitude Modulation constellation.

21. The non-transitory computer program product of claim 18, wherein a PDCCH has associated data to indicate which subframe or subframes use the linear m-ary modulation constellation.

22. The non-transitory computer program product of claim 21, wherein the associated data comprises a bit pattern to identify which subframe or subframes use the linear m-ary modulation constellation.

23. The non-transitory computer program product of claim 18, wherein the EPDCCH has associated data to provide an indication of which EPDCCH resources use the linear m-ary modulation constellation.

24. The non-transitory computer program product of claim 23, wherein the associated data comprises a bit pattern to identify which EPDCCH resources use the linear m-ary modulation constellation.

25. A non-transitory computer program product comprising machine-readable storage storing a computer program having instructions arranged, when executed, to cause a user equipment to:
remove at least one cyclic prefix from a received signal; the received signal being a downlink control signal comprising orthogonal frequency division multiplexing ("OFDM") symbols modulated with a linear modulation constellation;
output the OFDM symbols without the at least one cyclic prefix;
receive the OFDM symbols and output an associated plurality of subcarriers;
Fourier transform the associated plurality of subcarriers to a further plurality of subcarriers;
select one or more than one of the further plurality of subcarriers for demodulation and output any selected further subcarriers for demodulation; and
demodulate any output selected further subcarriers according to the linear modulation constellation,
wherein the linear modulation constellation comprises a plurality of linearly disposed points.

26. The non-transitory computer program product of claim 25, wherein the linear modulation constellation is a Pulse Amplitude Modulation constellation.

27. The non-transitory computer program product of claim 25, wherein the received signal comprises at least a physical downlink control channel ("PDCCH") having associated data for indicating which subframe or subframes thereof use the linear m-ary modulation constellation.

28. The non-transitory computer program product of claim 27, wherein the associated data is a bit pattern identifying which subframe or subframes use the linear m-ary modulation constellation.

29. The non-transitory computer program product of claim 25, wherein the received signal comprises at least an enhanced physical downlink control channel ("EPDCCH") having associated data to provide an indication of which EPDCCH resources thereof use the linear m-ary modulation constellation.

30. The non-transitory computer program product of claim 29, wherein the associated data is a bit pattern identifying which EPDCCH resources use the linear m-ary modulation constellation.

* * * * *